(12) United States Patent
Nguyen et al.

(10) Patent No.: US 7,040,403 B2
(45) Date of Patent: May 9, 2006

(54) METHODS FOR CONTROLLING MIGRATION OF PARTICULATES IN A SUBTERRANEAN FORMATION

(75) Inventors: Philip D. Nguyen, Duncan, OK (US); Thomas E. Rush, Richmond, TX (US); Jimmie D. Weaver, Duncan, OK (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 240 days.

(21) Appl. No.: 10/649,029

(22) Filed: Aug. 27, 2003

(65) Prior Publication Data

US 2005/0049151 A1    Mar. 3, 2005

(51) Int. Cl.
*E21B 33/138* (2006.01)
*E21B 43/267* (2006.01)

(52) U.S. Cl. .................. 166/281; 166/294; 166/295

(58) Field of Classification Search ................ 166/281, 166/294, 295; 523/131
See application file for complete search history.

(56) References Cited

U.S. PATENT DOCUMENTS

| | | | | |
|---|---|---|---|---|
| 4,670,501 A | | 6/1987 | Dymond et al. ............ 524/458 |
| 4,681,165 A | * | 7/1987 | Bannister .................... 166/312 |
| 4,772,646 A | | 9/1988 | Harms et al. ................. 524/27 |
| 4,777,200 A | | 10/1988 | Dymond et al. ............ 524/458 |
| 5,249,627 A | | 10/1993 | Harms et al. ............... 166/308 |
| 5,278,203 A | | 1/1994 | Harms ........................ 523/200 |
| 5,381,864 A | | 1/1995 | Nguyen et al. |
| 5,492,178 A | | 2/1996 | Nguyen et al. |
| 5,501,274 A | | 3/1996 | Nguyen et al. |
| 5,582,249 A | | 12/1996 | Caveny et al. |
| 5,697,440 A | | 12/1997 | Weaver et al. |
| 5,775,425 A | | 7/1998 | Weaver et al. |
| 5,787,986 A | | 8/1998 | Weaver et al. |
| 5,833,000 A | | 11/1998 | Weaver et al. ............. 166/276 |
| 5,839,510 A | | 11/1998 | Weaver et al. |
| 5,853,048 A | | 12/1998 | Weaver et al. ............. 166/279 |
| 5,871,049 A | | 2/1999 | Weaver et al. ............. 166/276 |
| 5,921,317 A | | 7/1999 | Dewprashad et al. |
| 5,924,488 A | | 7/1999 | Nguyen et al. |
| 5,960,878 A | * | 10/1999 | Nguyen et al. ............. 166/276 |
| 6,016,870 A | | 1/2000 | Dewprashad et al. ....... 166/295 |
| 6,047,772 A | | 4/2000 | Weaver et al. |
| 6,059,034 A | | 5/2000 | Rickards et al. |
| 6,209,643 B1 | | 4/2001 | Nguyen et al. ............. 166/276 |
| 6,311,773 B1 | | 11/2001 | Todd et al. ................. 166/280 |
| 6,330,916 B1 | | 12/2001 | Rickards et al. |
| 6,439,309 B1 | | 8/2002 | Matherly et al. |
| 6,450,260 B1 | | 9/2002 | James et al. |
| 6,534,449 B1 | * | 3/2003 | Gilmour et al. ............ 507/203 |
| 2003/0230408 A1 | | 12/2003 | Acock et al. |
| 2004/0014608 A1 | | 1/2004 | Nguyen et al. |

FOREIGN PATENT DOCUMENTS

EP    0 879 935 A2    11/1998
EP    1132569 A2    12/2001

OTHER PUBLICATIONS

Foreign Search Report and Opinion (PCT Appl. No. GB2004/002943), Nov. 19, 2004.
Attia, Yosry, et al, *Adsorption Thermodynamics of a Hydrophobic Polymeric Flocculant on Hydrophobic Colloidal Coal Particles*, 1991, American Chemical Society, Langmuir, 7, pp. 2203-2207.

* cited by examiner

*Primary Examiner*—George Suchfield
(74) *Attorney, Agent, or Firm*—Robert A. Kent; Baker Botts

(57) ABSTRACT

The present invention relates to methods for controlling the migration of particulates, such as proppant and formation sands, from subterranean formations using solutions of tackifying materials. One embodiment of the present invention provides a method of treating a subterranean formation comprising the steps of placing a tackifying composition into the subterranean formation and then placing an afterflush fluid into the subterranean formation.

40 Claims, No Drawings

METHODS FOR CONTROLLING MIGRATION OF PARTICULATES IN A SUBTERRANEAN FORMATION

FIELD OF THE INVENTION

The present invention relates to methods for controlling the migration of particulates, such as proppant and formation sands, in subterranean formations using solutions of tackifying materials.

DESCRIPTION OF THE PRIOR ART

Hydrocarbon wells are often located in subterranean zones that contain unconsolidated particulates that may migrate within the subterranean formation with the oil, gas, water, and/or other fluids produced by the wells. The presence of particulates, such as formation sand, in produced fluids is disadvantageous and undesirable in that the particulates may abrade pumping and other producing equipment and reduce the fluid production capabilities of the producing zones. Unconsolidated subterranean zones include those that contain loose particulates and those wherein the bonded particulates have insufficient bond strength to withstand the forces produced by the production of fluids through the zones.

One method of controlling particulates in unconsolidated formations involves placing a filtration bed containing gravel near the well bore in order to present a physical barrier to the transport of unconsolidated formation fines with the production of hydrocarbons. Typically, such so-called "gravel packing operations" involve the pumping and placement of a quantity of a desired particulate into the unconsolidated formation in an area adjacent to a well bore. One common type of gravel packing operation involves placing a gravel pack screen in the well bore and packing the surrounding annulus between the screen and the well bore with gravel of a specific size designed to prevent the passage of formation sand. The gravel pack screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow. When installing the gravel pack, the gravel is carried to the formation in the form of a slurry by mixing the gravel with a viscose transport fluid. Once the gravel is placed in the well bore, the viscosity of the transport fluid is reduced, and it is returned to the surface. Some gravel packing operations, commonly known as "high-rate water packing" operations, the transport fluid viscosity is somewhat lowered and yet the gravel remains in suspension because the treatment occurs at a substantially higher velocity. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. Such packs may be time consuming and expensive to install.

Another method used to control particulates in unconsolidated formations involves consolidating unconsolidated subterranean producing zones into hard, permeable masses by applying a resin followed by a spacer fluid and then a catalyst. Such resin application may be problematic when, for example, an insufficient amount of spacer fluid is used between the application of the resin and the application of the external catalyst. The resin may come into contact with the external catalyst in the well bore itself rather than in the unconsolidated subterranean producing zone. When resin is contacted with an external catalyst an exothermic reaction occurs that may result in rapid polymerization, potentially damaging the formation by plugging the pore channels, halting pumping when the well bore is plugged with solid material, or resulting in a down hole explosion as a result of the heat of polymerization. Also, using these conventional processes to treat long intervals of unconsolidated regions is not practical due to the difficulty in determining if the entire interval has been successfully treated with both the resin and the external catalyst.

In addition to the unconsolidated formation sands often found in subterranean formations, particulate materials are often introduced into subterranean zones in conjunction with conductivity enhancing operations and sand control operations. Conductivity enhancing and sand control operations may be performed as individual treatments, or may be combined where desired.

SUMMARY OF THE INVENTION

The present invention relates to methods for controlling the migration of particulates, such as proppant and formation sands, from subterranean formations using solutions of tackifying materials.

One embodiment of the present invention provides a method of treating a subterranean formation comprising the steps of placing a tackifying composition into the subterranean formation and then placing an after-flush fluid into the subterranean formation.

Another embodiment of the present invention provides a method of controlling fines migration in a subterranean formation comprising the steps of placing a tackifying composition into the subterranean formation and then placing an after-flush fluid into the subterranean formation.

Other and further objects, features and advantages of the present invention will be readily apparent to those skilled in the art upon a reading of the description of preferred embodiments which follows.

DESCRIPTION OF PREFERRED EMBODIMENTS

The present invention relates to methods for controlling the migration of particulates, such as proppant and formation sands, from subterranean formations using solutions of tackifying materials.

One embodiment of the present invention describes a method of controlling particulates in a subterranean formation comprising the steps placing successively into a subterranean zone an optional pre-flush fluid, a low-viscosity tackifying composition, and an after-flush fluid.

When used, suitable pre-flush fluids comprise an aqueous liquid and, optionally, a surfactant. The aqueous liquid used may be fresh water, salt water (e.g., water containing one or more salts dissolved therein), brine, seawater, or any other aqueous liquid that does not adversely react with the other components used in accordance with this invention or with the subterranean formation. In some embodiments of the present invention, it may be desirable to add a surfactant to the pre-flush fluid. The surfactant may act, inter alia, to prepare the formation particulates to accept and adhere the tackifying material.

Any surfactant compatible with the later-used low-viscosity non-curable tackifying composition and capable of facilitating the coating of the tackifying composition on the subterranean particles and aiding the tackifying composition in flowing to the contact points between adjacent particulates in the formation may be optionally used in the present invention. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773 issued to Todd et al. on Nov. 6, 2001, the disclosure of which is incorporated herein by reference. A $C_{12}$–$C_{22}$ alkyl phosphonate surfactant is preferred. The surfactant or surfactants used are included in the aqueous liquid in an amount sufficient to prepare the subterranean formation to receive a treatment of low-viscosity resin by wetting the particulates in the formation so that the resin can attach to those particulates. In some embodiments of the present invention, the aqueous surfactant fluid comprises surfactant in an amount ranging from about 0.1% to about 15% by weight of the aqueous liquid.

Tackifying compositions suitable for use in the methods of the present invention exhibit a sticky character and, thus, impart a degree of consolidation to particulates but they do not cure or harden over time. Compounds suitable for use as a tackifier in the tackifying compositions of the present invention comprise substantially any compound which, when in liquid form or in a solvent solution, will form a non-hardening coating upon a particulate. A particularly preferred group of tackifiers comprise polyamides which are liquids or in solution at the temperature of the subterranean formation such that the polyamides are, by themselves, non-hardening when present on the particulates introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride and acrylic acid and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like. Suitable tackifying compounds are described in U.S. Pat. No. 5,853,048 issued to Weaver, et al. and U.S. Pat. No. 5,833,000 issued to Weaver, et al., the disclosures of which are herein incorporated by reference.

In order for the tackifying composition of the present invention to achieve a low enough viscosity to be suitable for use in the present invention, a solvent may be needed. The methods of the present invention call for the viscosity of the tackifying composition to be less than about 100 cP, preferably less than about 50 cP, and still more preferably less than about 10 cP. The concentration of tackifier in the tackifying composition may be quantified by considering the percent of active tackifier as compared to the percentage of active tackifier before any solvent is added. In some embodiments of the present invention, the tackifying composition is from about 0.1% to about 50% active, preferably from about 1% to about 10% active.

It is within the ability of one skilled in the art, with the benefit of this disclosure, to determine whether a solvent is needed to achieve a viscosity suitable to the subterranean conditions and, if so, how much. Any solvent that is compatible with the tackifying agent and achieves the desired viscosity effects is suitable for use in the present invention. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof.

In the methods of the present invention, the after-flush fluid acts, inter alia, to remove the solvent used to the control the viscosity of the tackifying composition. Suitable after-flush fluids comprise an aqueous liquid and, optionally, a surfactant. The aqueous liquid used may be fresh water, salt water (e.g., water containing one or more salts dissolved therein), brine, seawater, or any other aqueous liquid that does not adversely react with the other components used in accordance with this invention or with the subterranean formation. In some embodiments of the present invention, it may be desirable to add a surfactant to the after-flush fluid. The surfactant may act, inter alia, to prepare the formation particulates to accept and adhere the tackifying material. Any surfactant compatible with the low-viscosity non-curable tackifying composition and capable of aiding the after-flush fluid to flow to the contact points between adjacent particulates in the formation may be used in the present invention. Such surfactants include, but are not limited to those listed above in connection with the pre-flush fluid.

Following the placement of the after-flush, what remains is a relatively concentrated film or layer of consolidating tackifying composition on the proppant or formation sand. That layer of tackifying composition acts, inter alia, to prolong the production rates of the well as high as possible by controlling the movement of subterranean particulates and keeping them from plugging productive pore spaces and channels. The ability of the tackifying composition to form a thin layer on the formation particulates allows the methods of the present invention to be useful even in situations where the pore spaces are relatively small, such as following an acidizing treatment, or before or after hydraulic fracturing, frac packing, water fracturing, and gravel packing.

The pre-flush fluid, tackifying composition, and after-flush fluid are preferably introduced to the subterranean formation at a matrix flow rate. That is, the fluids are added at such a rate that they are able to penetrate the formation without substantially effecting the structure of the formation sands or proppant matrixes they encounter.

To facilitate a better understanding of the present invention, the following examples of some of the preferred embodiments are given. In no way should such examples be read to limit the scope of the invention.

EXAMPLES

Example 1

Tackifying compositions were made comprising 75% to 78% dipropylene glycol methyl ether by weight of the composition, 20% butyl bottom alcohol by weight of the composition, and tackifier fluid. The amount of tackifier fluid ranged from 2% to 5% by weight of the composition.

A first series of tests was preformed on a simulated formation sand mixture comprising 88% 70/170-mesh natural sand, 10% silica fines, and 2% smectite, all by weight of the total sand mixture. The sand mixture was packed into a Hassler sleeve, pre-flushed with a solution of 5% $NH_4Cl$ brine, and the initial permeability of the packed sand mixture was determined. Next, the tackifying composition was introduced to the packed sand mixture, followed by an after-flush fluid of 5% $NH_4Cl$ brine. The flow rates of the pre-flush fluid, tackifying composition, and after-flush fluid were all kept to between 1 mL/minute and 10 mL/minute to maintain a matrix flow rate. The permeability of the packed sand mixture was again determined after the after-flush treatment was complete. In all of the tests, the permeability of the packed sand mixture after the after-flush treatment was found to be either the same as or higher than the initial permeability of the packed sand mixture.

Example 2

A second series of tests was run using the tackifying compositions described above and involved visualization microscopy through micro-cells. The microcells were prepared by packing and sealing in place between two microscopy slides 16/30-mesh re-sieved sand and 200-mesh and smaller formation sand. Inlet and outlet ports were connected to the packed slide using 6-gauge needles. A syringe pump was used to inject 5 mL of a pre-flush solution of 5% $NH_4Cl$ brine, followed by 2 mL of the tackifying composition described above, followed by 5 mL of an after-flush solution of 5% $NH_4Cl$ brine. The injection rates of the pre-flush fluid, tackifying composition, and after-flush fluid were all kept to between 1 mL/minute and 2 mL/minute to maintain a matrix flow rate. A control was also developed wherein no tackifying composition or after-flush fluid were injected.

To simulate production, brine was injected into the outlet port of the packed slide. When production was simulated on the control slide, the fines quickly dispersed, migrated, and invaded the pore spaces of the 16/30-mesh sand. When production was simulated on the packed slides that had been treated with a tackifying composition and an after-flush fluid, no migration of fines was noted even when the "production" flow rate was surged and paused repeatedly. The migration of the fines was equally well controlled with a tackifying composition comprising 2% active tackifier and one comprising 5% active tackifier.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of treating a subterranean formation comprising the steps of:
    (a) placing a tackifying composition into the subterranean formation so as to form a coating on one or more particulates present in the subterranean formation, wherein the one or more particulates were present in the subterranean formation prior to the placement of the tackifying composition therein; and,
    (b) placing an after-flush fluid into the subterranean formation.

2. The method of claim 1 further comprising, before step (a), the step of:
    placing a pre-flush fluid into the subterranean formation.

3. The method of claim 2 wherein the pre-flush fluid comprises an aqueous liquid selected from the group consisting of fresh water, salt water, brine, seawater, and combinations thereof.

4. The method of claim 2 wherein the pre-flush fluid further comprises a surfactant.

5. The method of claim 4 wherein the surfactant is selected from the group consisting of an ethoxylated nonyl phenol phosphate.

6. The method of claim 2 where in the pre-flush fluid is placed into the subterranean formation at a matrix flow rate. ester, a cationic surfactant, a non-ionic surfactant, an alkyl phosphonate surfactant, and combinations thereof.

7. The method of claim 1 wherein the tackifying composition comprises a tackifier.

8. The method of claim 7 wherein the tackifier is selected from the group consisting of a polyamide, a polyester, a polycarbonate, polycarbamate, a natural resin and combinations thereof.

9. The method of claim 1 wherein the tackifying composition further comprises a solvent.

10. The method of claim 9 wherein the solvent is selected from the group consisting of butylglycidyl ether, dipropylene glycol methyl ether, butyl bottom alcohol, dipropylene glycol dimethyl ether, dimethyl formamide, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, a fatty acid methyl ester, and combinations thereof.

11. The method of claim 1 wherein the viscosity of the tackifying composition is less than about 100 cP.

12. The method of claim 1 wherein the percent active tackifier in the tackifying composition is from about 1% to about 10%.

13. The method of claim 1 wherein the after-flush fluid comprises an aqueous liquid selected from the group consisting of fresh water, salt water, brine, seawater, and combinations thereof.

14. The method of claim 1 wherein the after-flush fluid further comprises a surfactant.

15. The method of claim 14 wherein the surfactant is selected from the group consisting of an ethoxylated nonyl phenol phosphate ester, a cationic surfactant, a non-ionic surfactant, an alkyl phosphonate surfactant, and combinations thereof.

16. The method of claim 1 where in the tackifying composition is placed into the subterranean formation at a matrix flow rate.

17. The method of claim 1 where in the after-flush fluid is placed into the subterranean formation at a matrix flow rate.

18. The method of claim 1 wherein the one or more particulates are selected from the group consisting of formation sand, proppant, and combinations thereof.

19. The method of claim 1 wherein the coating formed on the one or more particulates is a non-hardening coating.

20. The method of claim 1 wherein the coating covers 100% of the outer surface of the one or more particulates.

21. A method of controlling fines migration in a subterranean formation comprising the steps of:
(a) placing a tackifying composition into the subterranean formation so as to form a coating on one or more particulates present in the subterranean formation, wherein the one or more particulates were present in the subterranean formation prior to the placement of the tackifying composition therein; and,
(b) placing an after-flush fluid into the subterranean formation.

22. The method of claim 21 further comprising, before step (a), the step of:
placing a pre-flush fluid into the subterranean formation.

23. The method of claim 22 wherein the pre-flush fluid comprises an aqueous liquid selected from the group consisting of fresh water, salt water, brine, seawater, and combinations thereof.

24. The method of claim 22 wherein the pre-flush fluid further comprises a surfactant.

25. The method of claim 24 wherein the surfactant is selected from the group consisting of an ethoxylated nonyl phenol phosphate ester, a cationic surfactant, a non-ionic surfactant, an alkyl phosphonate surfactant, and combinations thereof.

26. The method of claim 22 where in the pre-flush fluid is placed into the subterranean formation at a matrix flow rate.

27. The method of claim 21 wherein the tackifying composition comprises a tackifier.

28. The method of claim 27 wherein the tackifier is selected from the group consisting of a polyamide, a polyester, a polycarbonate, polycarbamate, a natural resin and combinations thereof.

29. The method of claim 21 wherein the tackifying composition further comprises a solvent.

30. The method of claim 29 wherein the solvent is selected from the group consisting of butylglycidyl ether, dipropylene glycol methyl ether, butyl bottom alcohol, dipropylene glycol dimethyl ether, dimethyl formamide, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, a fatty acid methyl ester, and combinations thereof.

31. The method of claim 21 wherein the viscosity of the tackifying composition is less than about 100 cP.

32. The method of claim 21 wherein the percent active tackifier in the tackifying composition is from about 1% to about 10%.

33. The method of claim 21 wherein the after-flush fluid comprises an aqueous liquid selected from the group consisting of fresh water, salt water, brine, seawater, and combinations thereof.

34. The method of claim 21 wherein the after-flush fluid further comprises a surfactant.

35. The method of claim 34 wherein the surfactant is selected from the group consisting of an ethoxylated nonyl phenol phosphate ester, a cationic surfactant, a non-ionic surfactant, an alkyl phosphonate surfactant, and combinations thereof.

36. The method of claim 21 where in the tackifying composition is placed into the subterranean formation at a matrix flow rate.

37. The method of claim 21 where in the after-flush fluid is placed into the subterranean formation at a matrix flow rate.

38. The method of claim 21 wherein the one or more particulates are selected from the group consisting of formation sand, proppant, and combinations thereof.

39. The method of claim 21 wherein the coating formed on the one or more particulates is a non-hardening coating.

40. The method of claim 21 wherein the coating covers 100% of the outer surface of the one or more particulates.

* * * * *